US011586403B2

(12) United States Patent
Sueshige

(10) Patent No.: US 11,586,403 B2
(45) Date of Patent: Feb. 21, 2023

(54) INFORMATION PROCESSING SYSTEM, INFORMATION PROCESSING APPARATUS, AND NON-TRANSITORY COMPUTER-READABLE STORAGE MEDIUM STORING PROGRAM

(71) Applicant: CANON KABUSHIKI KAISHA, Tokyo (JP)

(72) Inventor: Yoshiko Sueshige, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/324,256

(22) Filed: May 19, 2021

(65) Prior Publication Data

US 2021/0373826 A1 Dec. 2, 2021

(30) Foreign Application Priority Data

May 28, 2020 (JP) .............................. JP2020-093672

(51) Int. Cl.
*G06F 3/12* (2006.01)

(52) U.S. Cl.
CPC .......... *G06F 3/1239* (2013.01); *G06F 3/1219* (2013.01); *G06F 3/1234* (2013.01); *G06F 3/1259* (2013.01)

(58) Field of Classification Search
None
See application file for complete search history.

(56) References Cited

U.S. PATENT DOCUMENTS

2007/0124436 A1* 5/2007 Shepherd .............. G06F 3/1204
709/223
2017/0223127 A1 8/2017 Matsutani

FOREIGN PATENT DOCUMENTS

| JP | 2003103860 A | * | 4/2003 |
| JP | 2007041840 A | * | 2/2007 |
| JP | 2017134628 A |   | 8/2017 |

* cited by examiner

*Primary Examiner* — Fan Zhang
(74) *Attorney, Agent, or Firm* — Venable LLP

(57) ABSTRACT

An information processing system includes an information processing apparatus that obtains a state of a job input to a printing apparatus, generates, based on the state of the obtained job, notification information including instruction information used to control the job, and transmits the generated notification information to a network. A mobile terminal apparatus receives the notification information from the network, and notifies, based on the received notification information, the instruction information used to control the job. The information processing apparatus also estimates an execution result of a job which has been input to the printing apparatus but is in an execution standby state, obtains, as a state of the job, the estimated execution result, and in a case in which the estimated execution result indicates abnormal completion, generates the notification information including the instruction information used to control the job.

21 Claims, 15 Drawing Sheets

| IDENTIFICATION NUMBER 1001 | TERMINAL INFORMATION 1002 | LOCATION INFORMATION 1201 | JOB IDENTIFICATION INFORMATION 1003 | JOB CONTROL INFORMATION 1004 |
|---|---|---|---|---|
| X00001 | aaabcd | ********** | 1111 | WAITING FOR RECEPTION |
| X00002 | eeefgh | ********** | 2222 | "NONE" |
| X00003 | iiijklmn | ********** | 3333 | "CONTINUE" |
| Y00004 | opppqr | ********** | 4444 | "STOP" |

INFORMATION PROCESSING SYSTEM, INFORMATION PROCESSING APPARATUS, AND NON-TRANSITORY COMPUTER-READABLE STORAGE MEDIUM STORING PROGRAM

BACKGROUND OF THE INVENTION

Field of the Invention

The present disclosure relates to an information processing system that informs the state of a job, an information processing apparatus, and a non-transitory computer-readable storage medium storing a program.

Description of the Related Art

Conventionally, a system has been known in which a plurality of personal computers (to be referred to as PCs hereinafter) and a printer are connected via a network to efficiently perform printing. On the other hand, a technique called "push notification" has been known in which a mobile terminal apparatus such as a smartphone externally receives notification information and displays a notification screen based on the notification information. Japanese Patent Laid-Open No. 2017-134628 describes a configuration in which a mobile terminal apparatus receives, from a push notification distribution server, notification information used to display information regarding a communication apparatus such as a printer and informs it. In Japanese Patent Laid-Open No. 2017-134628, a user carrying the mobile terminal apparatus can check the status of print processing as the notification information even if the user is located away from the printer or the PC that has transmitted print data.

SUMMARY OF THE INVENTION

The present disclosure provides an information processing system that enables a mobile terminal apparatus, which is located away, via a network, from a printer and an information processing apparatus that controls the printer, to instruct control of print processing in the printer, an information processing apparatus, and a non-transitory computer-readable storage medium storing a program.

Various embodiments of the present disclosure provide an information processing system including an information processing apparatus capable of communicating with a printing apparatus, and a mobile terminal apparatus, the information processing apparatus comprising: an obtaining unit configured to obtain a state of a job input to the printing apparatus; a generating unit configured to generate, based on the state of the job obtained by the obtaining unit, notification information including instruction information used to control the job; and a transmitting unit configured to transmit the notification information generated by the generating unit to a network, and the mobile terminal apparatus comprising: a receiving unit configured to receive the notification information from the network; and a notifying unit configured to notify, based on the notification information received by the receiving unit, the instruction information used to control the job.

According to various embodiments of the present disclosure, it is possible to enable a mobile terminal apparatus, which is located away, via a network, from a printer and an information processing apparatus that controls the printer, to instruct control of print processing in the printer.

Further features will become apparent from the following description of exemplary embodiments with reference to the attached drawings.

BRIEF DESCRIPTION OF THE DRAWINGS

FIG. 12 is a view showing another notification information management table;

DESCRIPTION OF THE EMBODIMENTS

Figure 1:
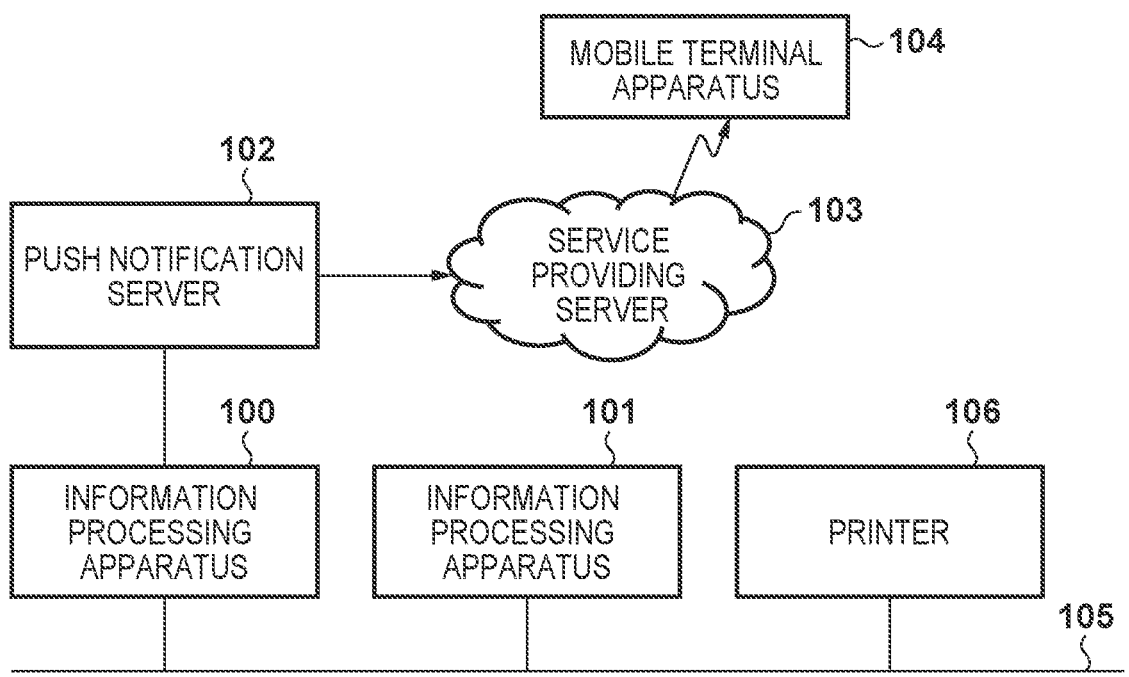
FIG. 1 is a view showing the configuration of an information processing system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Japanese Patent Laid-Open No. 2017-134628 does not mention instructing control of print processing in a printer from a mobile terminal apparatus which is located away from the printer and a PC via a network.

According to various embodiments of the present disclosure, a mobile terminal apparatus, which is located away, via a network, from a printer and an information processing apparatus that controls the printer, can instruct control of print processing in the printer.

First, a terminal apparatus and an information processing apparatus according to this embodiment will be described. In this embodiment, a smartphone is described as an example of the mobile terminal apparatus. The smartphone is a multi-function mobile phone that has a camera function, a web browser function, an email function, and the like in addition to a mobile phone function. Note that the mobile terminal apparatus is not limited to the smartphone, but may be any apparatus that can communicate with a communication apparatus. For example, a digital camera, a mobile phone, a PC, a tablet terminal, or a PDA (Personal Digital Assistant) may be used as the mobile terminal apparatus. Further, in this embodiment, a PC is described as an example of the information processing apparatus. Note that the information processing apparatus is not limited to the PC, but may be any apparatus that can communicate with the mobile terminal apparatus. For example, an apparatus that can provide a service other than printing, such as a printing apparatus, a copy machine, a facsimile apparatus, a smartphone, a mobile phone, a tablet terminal, a PDA, a digital camera, a music playback device, a storage, a projector, or a smart speaker, may be used as the information processing apparatus. Furthermore, in this embodiment, an inkjet printing apparatus is described as an example of the printing apparatus controlled by the information processing apparatus. Note that the printing apparatus is not limited to the inkjet printing apparatus, but may be, for example, a printing apparatus that employs a printing method (electrophotographic method or thermal sublimation method) other than an inkjet printing method.

FIG. 1 is a view showing an example of the configuration of the information processing system according to this embodiment. A printer 106 is a printer capable of performing printing on a print medium such as a print sheet. Each of information processing apparatuses 100 and 101 has a function of controlling print processing in the printer 106. In at least one of the information processing apparatuses 100 and 101, a job monitoring system, which includes a function of monitoring the state of a print job and a function of notifying the state of the print job to a user based on user information capable of identifying the print job, is executed. The information processing apparatuses 100 and 101 and the printer 106 are interconnected via a network 105. The network 105 is a network including a wired network, a wireless network, or both of them. A mobile terminal apparatus 104 can communicate with a service providing server 103 via a network such as the Internet, and receives notification information via the network. Note that the mobile terminal apparatus 104 may communicate with the network via a mobile communication network such as 4G or LTE, or may communicate with the network via a wireless LAN router and a Wi-Fi connection (neither is shown).

When notification information is received from the information processing apparatus 100, a push notification server 102 transmits the notification information to the mobile terminal apparatus 104 via the service providing server 103. Note that at this time, the push notification server 102 may transmit the notification information to a plurality of the mobile terminal apparatuses 104. The service providing server 103 is a server that provides a push notification service. In this embodiment, a push notification function of causing a display unit to display a notification region by push notification is included in an OS (Operating System). Therefore, in order to use the push notification function, it is necessary to use a push notification service corresponding to each OS. Accordingly, the push notification server 102 does not transmit the notification information directly to the mobile terminal apparatus 104, but transmits the notification information via the service providing server 103. The push notification service to be used changes for each OS of the mobile terminal apparatus 104 that receives the notification by push notification. Accordingly, the push notification server 102 transmits the notification information to the mobile terminal apparatus 104 via the service providing server 103 which changes for each OS of the mobile terminal apparatus 104 serving as the target of push notification.

Note that in this embodiment, each of the push notification server 102 and the service providing server 103 is configured as one server, but the present disclosure is not limited to such a form. A server system corresponding to each of the push notification server 102 and the service providing server 103 may be constructed by a plurality of servers operating in cooperation.

Figure 2:
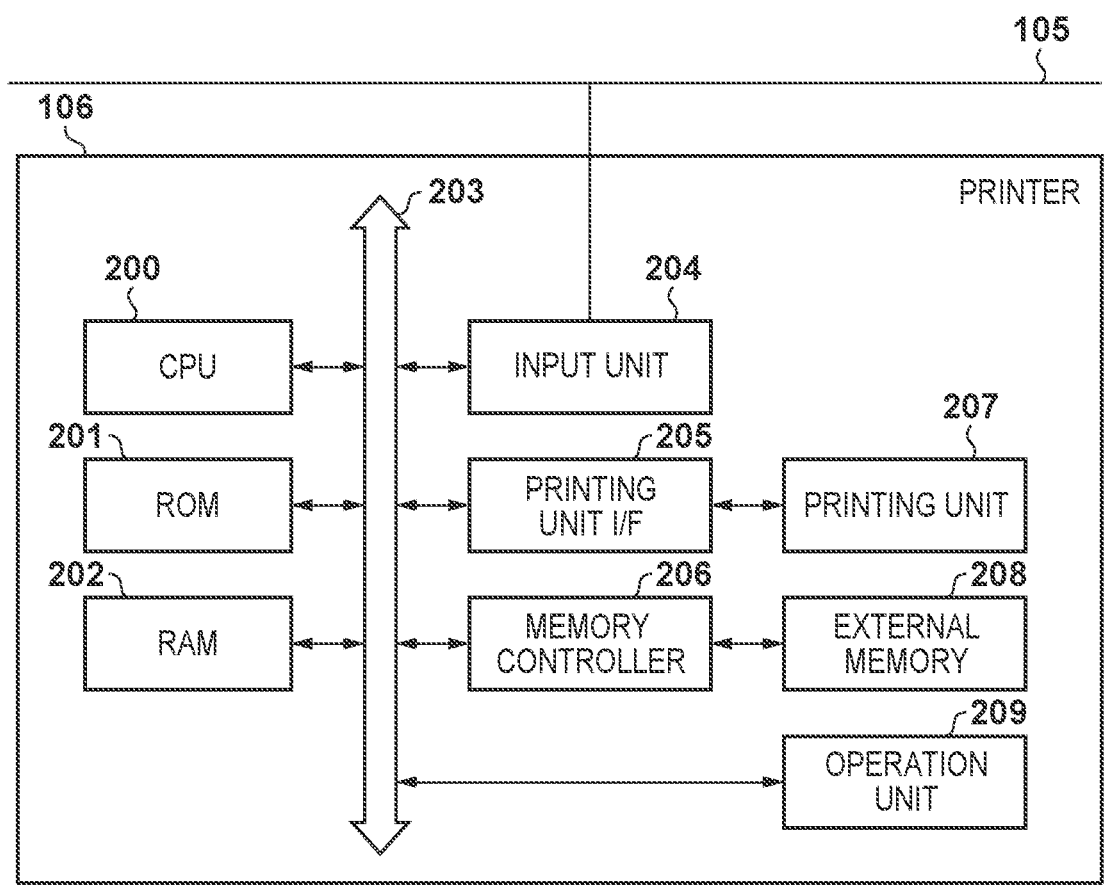
FIG. 2 is a block diagram showing the hardware arrangement of a printer.

FIG. 2 is a block diagram showing an example of the hardware arrangement of the printer 106. A CPU 200 comprehensively controls the printer 106. An operation of the printer 106 in this embodiment is implemented by, for example, the CPU 200 reading out and executing a control program or the like stored in a program ROM of a ROM 201 or a control program or the like stored in an external memory 208. For example, when printing is performed, the CPU 200 outputs, via a system bus 203, an image signal as output information to a printing unit (printer engine) 207 connected to a printing unit I/F (interface) 205. The CPU 200 can perform communication processing with the information processing apparatuses 100 and 101 via an input unit 204. For example, the CPU 200 transmits information in the printer 106 to the information processing apparatuses 100 and 101. Further, the CPU 200 can receive, via the input unit 204, output data to be output to the printing unit 207. A RAM 202 is a RAM which serves as a main memory, a work area, and the like of the CPU 200, and configured to be capable of expanding the memory capacity by an optional RAM connected to an expansion port (not shown). Note that the RAM 202 is used as, for example, an output information expansion area, an environmental data storage area, a non-volatile memory, or the like. A memory controller 206 controls access to the external memory 208 such as a hard disk (HDD) or an IC card. The external memory 208 is connected as an option, and stores font data, an emulation program, form data, information regarding the sheet registered in the printer 106, or the like. An operation unit 209 includes a panel serving as a display unit. The operation unit 209 can display various kinds of information such as a user interface screen, and can also accept a user operation such as a setting or instruction.

Figure 3:
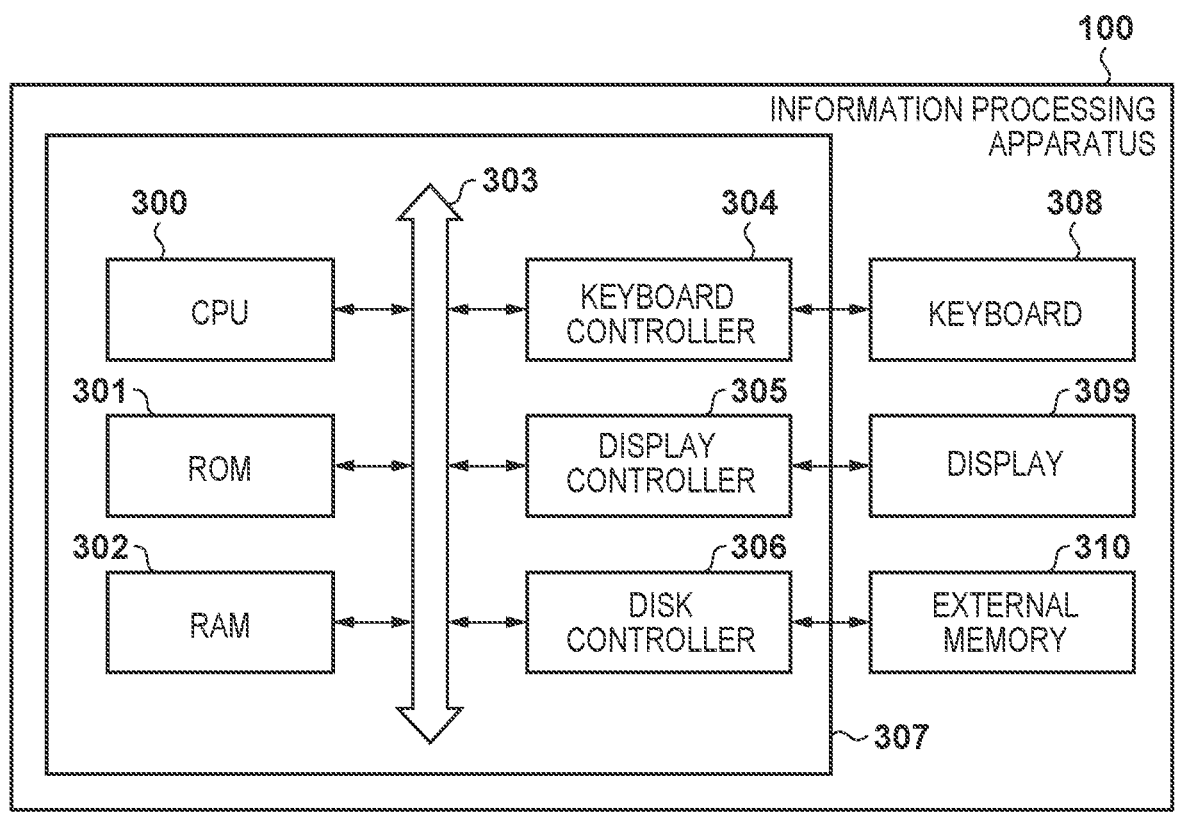
FIG. 3 is a block diagram showing the hardware arrangement of an information processing apparatus.

FIG. 3 is a block diagram showing an example of the hardware arrangement of the information processing apparatus 100. The information processing apparatus 101 has the similar arrangement. Hereinafter, the information processing apparatus 100 will be described as a representative example of the information processing apparatuses 100 and 101, unless otherwise specified. A CPU 300 of a main body 307 comprehensively controls the information processing apparatus 100 by controlling, via a main bus 303, respective units connected to the main bus 303. The CPU 300 is configured as a dedicated circuit such as, for example, an ASIC. Operations of the information processing apparatus 100 in this embodiment are implemented by, for example, reading out various kinds of programs such as a control program, a system program, and an application program from an external memory 310 into a RAM 302 via a disk controller 306 and executing them. For example, the CPU 300 performs various kinds of data processing operations by executing various kinds of programs read out into the RAM 302. The CPU 300 may read out the control program or the like from a ROM 301. Note that the disk controller 306 controls access to the external memory 310 such as an FD, an HD, a CD-ROM, a DVD-ROM, an MD, or an MO. The RAM 302 is configured to be capable of expanding the capacity by an optional RAM (not shown) or the like, and used as, for example, a work area of the CPU 300. A keyboard controller 304 controls a key input from a keyboard 308 or a pointing device (not shown). A display controller 305 controls display of a display 309. The information processing apparatus 100 can use, as a wireless communication method, for example, Wi-Fi® (Wireless Fidelity), BLE® (Bluetooth Low Energy), or Bluetooth Classic®. Note that the information processing apparatus 100 can use a wired communication method such as USB (Universal Serial Bus) or a wired LAN in addition to the wireless communication method.

Figure 4:
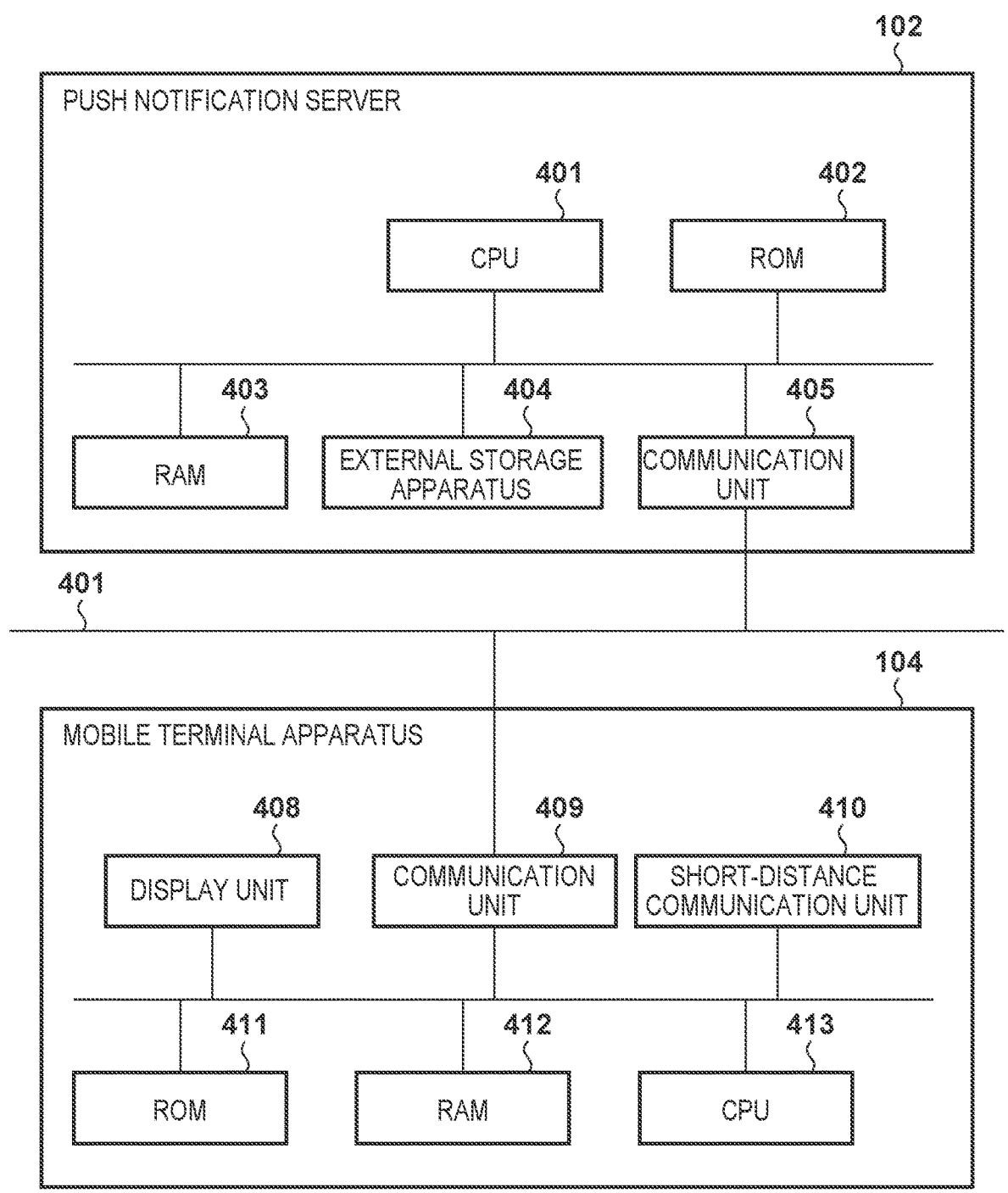
FIG. 4 is a block diagram showing the hardware arrangement of each of a push notification server and a mobile terminal apparatus.

FIG. 4 is a block diagram showing an example of the hardware arrangement of each of the push notification server 102 and the mobile terminal apparatus 104. As shown in FIG. 4, the push notification server 102 and the mobile terminal apparatus 104 are communicably interconnected via a network 401. The network 401 includes the service providing server 103. The push notification server 102 includes a CPU 401, a ROM 402, a RAM 403, an external storage apparatus 404, and a communication unit 405. The CPU 401 is a system control unit, and comprehensively controls the push notification server 102. The ROM 402 stores permanent data such as control programs to be executed by the CPU 401, a data table, and an OS program. An operation of the push notification server 102 in this embodiment is implemented by, for example, reading out and executing the program stored in the ROM 402. In this embodiment, the respective control programs stored in the ROM 402 perform software execution control such as scheduling, task switching, and interrupt processing under the management of the embedded OS stored in the ROM 402. The RAM 403 is formed by, for example, an SRAM or the like that requires a backup power supply. Note that since the RAM 403 holds data by a primary battery for data backup (not shown), data such as a program control variable can be stored without volatilization. A memory area for storing setting information of the push notification server 102, management data of the push notification server 102, and the like is also provided in the RAM 403. The RAM 403 is also used as a main memory and a work memory of the CPU 401. The external storage apparatus 404 stores a program for performing push notification to the mobile terminal apparatus 104 via the service providing server 103, and the like. Note that the push notification server 102 may include a plurality of communication units to use different communication methods for communication with another apparatus. For example, the communication unit used for communication between the push notification server 102 and the information processing apparatus 100 may be different from the communication unit used for communication between the push notification server 102 and an external server providing the service providing server 103.

The mobile terminal apparatus 104 includes a display unit 408, a communication unit 409, a short-distance communication unit 410, a ROM 411, a RAM 412, and a CPU 413. The CPU 413 is a system control unit, and comprehensively controls the mobile terminal apparatus 104. The ROM 411 stores permanent data such as control programs to be executed by the CPU 413, a data table, and an OS program. An operation of the mobile terminal apparatus 104 in this embodiment is implemented by, for example, reading out and executing the program stored in the ROM 411. In this embodiment, the respective control programs stored in the ROM 411 perform software execution control such as scheduling, task switching, and interrupt processing under the management of the embedded OS stored in the ROM 411. Examples of the OS held in the ROM 411 are iOS provided by Apple and Android provided by Google. Further, the ROM 411 stores various kinds of programs such as an application for analyzing received notification information and displaying a screen based on the notification information, and various kinds of information used by the programs. The RAM 412 is formed by, for example, an SRAM or the like that requires a backup power supply. Note that since the RAM 412 holds data by a primary battery for data backup (not shown), data such as a program control variable can be stored without volatilization. A memory area for storing setting information of the mobile terminal apparatus 104, management data of the mobile terminal apparatus 104, and the like is also provided in the RAM 412. The RAM 412 is also used as a main memory and a work memory of the CPU 413. The display unit 408 is formed by, for example, an LED (Light Emitting Diode) or an LCD (Liquid Crystal Display), and displays various kinds of data and a screen based on the notification information. The communication unit 409 is a component for performing data communication with another apparatus. For example, the communication unit 409 is connected to an external apparatus such as a wireless LAN router, and receives information from the push notification server 102 or the information processing apparatus 100 via the Internet. The short-distance communication unit 410 is a component for performing a short-distance wireless connection with another apparatus. Examples of the communication method are Bluetooth, WiFi Aware, and the like. In this embodiment, the short-distance communication unit 410 can perform, as a Bluetooth function, communication by BLE (Bluetooth Low Energy) and communication by Bluetooth Classic. Note that in this embodiment, the communication unit 409 can perform higher-speed communication than the short-distance communication unit 410, and the communicable distance of the communication unit 409 is longer than the communicable distance of the short-distance communication unit 410.

[Registration Processing for Push Notification]

In order to perform push notification to the mobile terminal apparatus 104, registration processing for push notification is performed. Note that the processing on the information processing apparatus 100 side in the registration processing to be described below is implemented by the CPU 300 executing a PC-side application stored in, for example, the ROM 301. The processing on the mobile terminal apparatus 104 side in the registration processing to be described below is implemented by the CPU 413 executing a terminal-side application stored in, for example, the ROM 411.

First, when a predetermined operation for generating a QR Code® is received from a user, the information processing apparatus 100 displays a QR code on a screen. Then, the mobile terminal apparatus 104 reads the QR code by a camera (not shown) included in the mobile terminal apparatus 104. The mobile terminal apparatus 104 analyzes the read QR code to obtain the identification information of the PC-side application that has generated the QR code and the user information registered in the PC-side application that has generated the QR code. Then, the mobile terminal apparatus 104 transmits, as registration information, the identification information of the mobile terminal apparatus 104 and the above-described pieces of information obtained by analyzing the QR code to the push notification server 102 via the Internet (this will be referred to as an information transmission step hereinafter). Note that the address or server name of the push notification server 102 to be used as the address of a transmission destination of the registration information is stored in the terminal-side application in advance. The identification information of the mobile terminal apparatus 104 includes, for example, a device token required for receiving push notification and OS information (OS type, OS version, and the like) regarding the OS held by the mobile terminal apparatus 104. The device token is information provided from the OS held by the mobile terminal apparatus 104, and includes the identification information of the terminal-side application and the like.

The information to be transmitted to the push notification server 102 may not be obtained from the QR code. For example, the mobile terminal apparatus 104 reads, by the camera (not shown) included in the mobile terminal apparatus 104, information in a text format displayed by the information processing apparatus 100. The information to be transmitted to the push notification server 102 may be extracted by analyzing the read information by an OCR (Optical Character Recognition/Reader). Alternatively, for example, the mobile terminal apparatus 104 may connect with the information processing apparatus 100 by a wireless communication method or a wired communication method, and obtain via the connection the information to be transmitted to the push notification server 102. With the configuration as described above, the push notification server 102 can recognize the correspondence between the PC-side application, from which notification information is received, and the mobile terminal apparatus 104, to which the notification information is to be transmitted.

In the manner as described above, the registration processing is completed. Note that in this embodiment, a form has been described in which the identification information of the PC-side application and the identification information of the mobile terminal apparatus 104 are associated with each other and managed by the push notification server 102, but the present disclosure is not limited to this form. For example, the identification information of the information processing apparatus 100 displaying the QR code may be obtained using the QR code. Then, the identification information of the information processing apparatus 100 and the identification information of the mobile terminal apparatus 104 may be associated with each other and managed by the push notification server 102. With such configuration, the push notification server 102 can recognize the correspondence between the information processing apparatus 100, from which notification information is received, and the mobile terminal apparatus 104, to which the notification information is to be transmitted.

Alternatively, for example, the mobile terminal apparatus 104 may obtain, by reading the QR code, the identification information of the printer 106 controlled by the PC-side application. Then, the identification information of the printer 106 and the identification information of the mobile terminal apparatus 104 may be associated with each other and managed by the push notification server 102. With such configuration, the push notification server 102 can recognize the correspondence between the printer 106, to which the notification information is related, and the mobile terminal apparatus 104, to which the notification information is to be transmitted.

Alternatively, the registration processing may be performed by, for example, a following method. The mobile terminal apparatus 104 connects with the information processing apparatus 100 by a wireless communication method or a wired communication method, and transmits the identification information of the mobile terminal apparatus 104 to the information processing apparatus 100 via the connection. The information processing apparatus 100 transmits the identification information of the PC-side application and the identification information of the mobile terminal apparatus 104 as registration information to the push notification server 102 via the Internet. In this manner, the identification information of the PC-side application and the identification information of the mobile terminal apparatus 104 may be associated with each other and managed by the push notification server 102, and the registration processing may be completed. Note that also in such registration processing, the identification information of the information processing apparatus 100 and the identification information of the mobile terminal apparatus 104 may be associated with each other and managed by the push notification server 102. Alternatively, the identification information of the printer 106 and the identification information of the mobile terminal apparatus 104 may be associated with each other and managed by the push notification server 102.

The method of transmitting the registration information in the registration processing is not particularly limited. For example, an HTTP method in which the registration information is converted into an HTML format and transmitted may be used, or an FTP method in which the registration information is created in a file format and the file is transmitted may be used. The registration information may be data encrypted using a security key shared by the push notification server 102 and the terminal-side application. Alternatively, the registration information may be binary data, text data such as UTF-8, or data encoded by a method such as Base64.

Push notification is a notification method of notifying the mobile terminal apparatus 104 using a push notification service. In this embodiment, the information processing apparatus 100 transmits, to the push notification server 102, notification information including a notification message corresponding to the information regarding the printer 106. Then, the push notification server 102 transmits the notification information including the notification message to the mobile terminal apparatus 104 via the service providing server 103. Thus, the push notification server 102 can notify the mobile terminal apparatus 104 of the information regarding the printer 106. When the notification information is received, the mobile terminal apparatus 104 displays, on a screen displayed by the display unit 408, a notification region for notifying the information regarding the printer 106.

[Operation of PC-Side Application]

Figure 5:
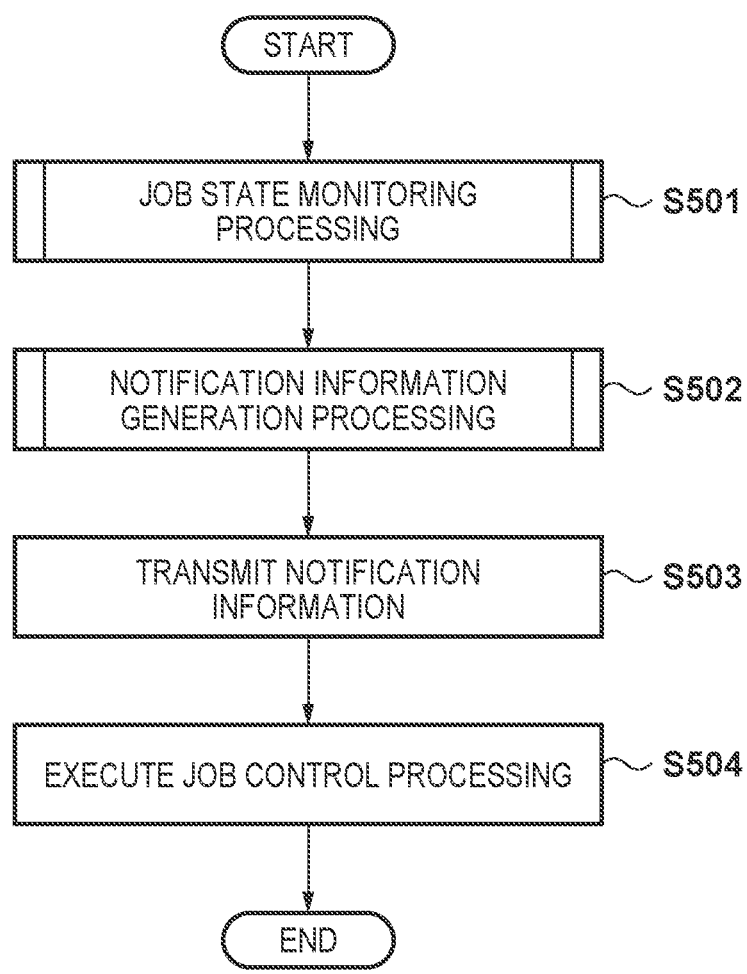
FIG. 5 is a flowchart illustrating processing performed by the information processing apparatus.

FIG. 5 is a flowchart illustrating processing performed by the information processing apparatus 100 in this embodiment. Each processing illustrated by the flowchart shown in FIG. 5 is implemented by, for example, the CPU 300 reading out the PC-side application stored in the ROM 301 or the like into the RAM 302 and executing it. In step S501, the CPU 300 monitors the job state by obtaining printer state information and print job queue information from the printer 106. Note that the CPU 300 may receive the printer state information and the print job queue information by polling the printer 106, or the printer 106 may actively transmit them. In step S502, the CPU 300 generates notification information based on the monitoring result of the job state obtained in step S501. In this embodiment, as will be described later, the notification information includes instruction information used to control the job. In step S503, the CPU 300 transmits the notification information generated in step S502 to the push notification server 102. In step S504, the CPU 300 obtains, from the push notification server 102, a job control method corresponding to the instruction information instructed by the mobile terminal apparatus 104 and, based on the obtained job control method, performs job control processing on the printer 106. After step S504, the process of FIG. 5 is terminated.

Figure 6:
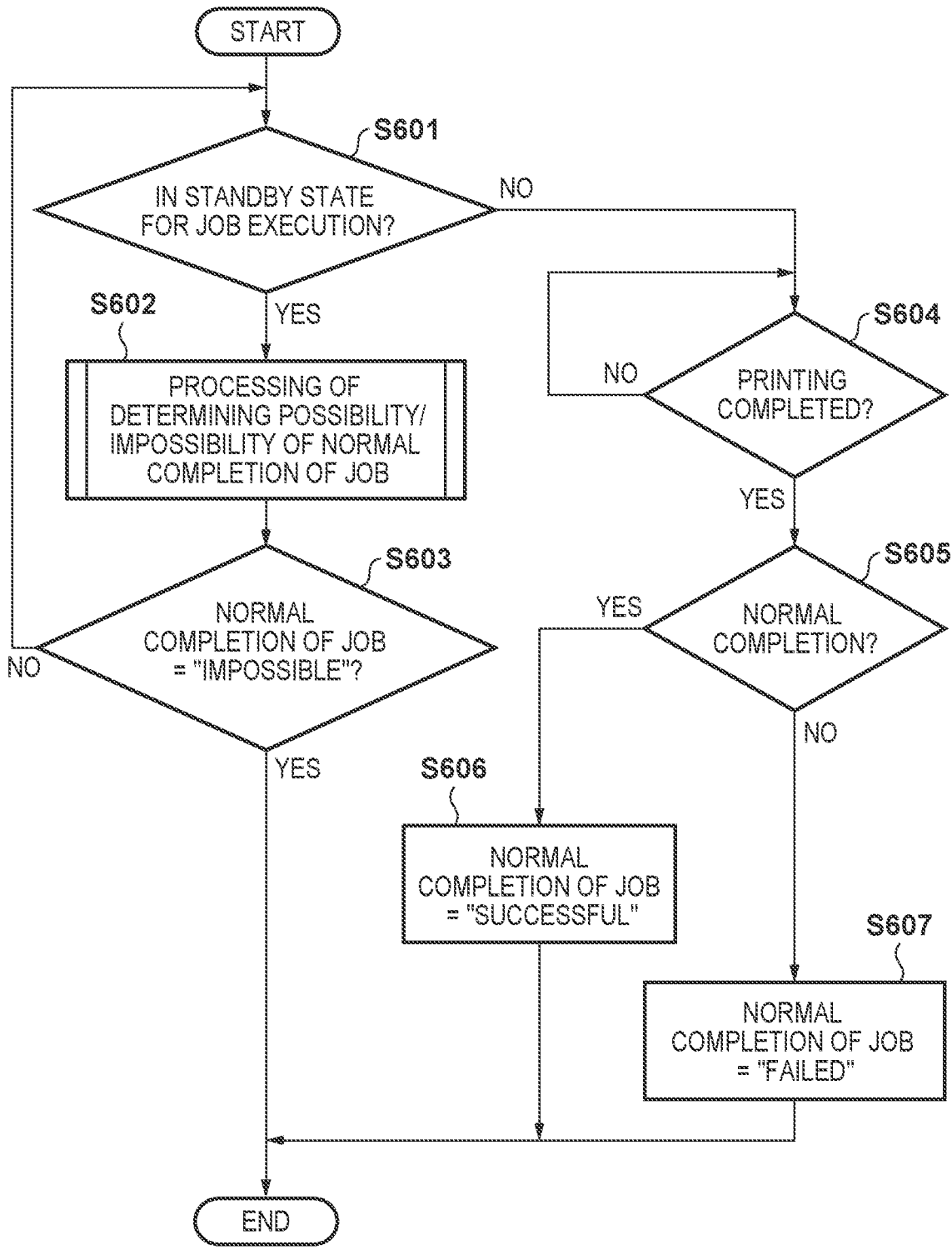
FIG. 6 is a flowchart illustrating processing in step S501.

FIG. 6 is a flowchart illustrating the job state monitoring processing in step S501. In step S601, the CPU 300 determines whether a monitoring-target print job is accumulated in a print job queue as an execution standby state. If it is determined that the print job is accumulated in the print job queue as the execution standby state, the processing advances to step S602, and the CPU 300 performs determination processing of determining whether the monitoring-target print job is completed normally. The processing in step S602 will be described later. In step S603, the CPU 300 determines whether the determination result in step S602 is "the job cannot be completed normally". Here, if it is determined that "the job cannot be completed normally", the processing in FIG. 6 is terminated. On the other hand, if it is not determined that "the job cannot be completed normally", the processing from step S601 is repeated. Unless there is a difference between the setting of the print job and the setting of the printer 106 or a shortage of consumables, the processing from step S601 to step S603 is repeated until the execution standby state of the print job is canceled and printing is started.

If it is determined in step S601 that the monitoring-target print job is not accumulated in the print job queue as the execution standby state, for example, if the execution standby state of the print job has been canceled and printing has been started, the CPU 300 determines in step S604 whether the print processing is completed. The processing in step S604 is repeated until it is determined that the print processing is completed. If it is determined in step S604 that the print processing is completed, the CPU 300 determines in step S605 whether the print processing is completed normally. Here, if it is determined that the print processing is completed normally, the CPU 300 determines in step S606 that the print job has been completed normally, and then the processing of FIG. 6 is terminated. In step S606, the CPU 300 stores, for example, flag information such as "normal completion of job="successful"" in the storage area. On the other hand, if it is determined that the print processing is not completed normally, in step S607, the CPU 300 determines that the print job is not completed normally, and then the processing of FIG. 6 is terminated. In step S607, the CPU 300 stores, for example, flag information such as "normal completion of job="failed"" in the storage area.

Figure 7:
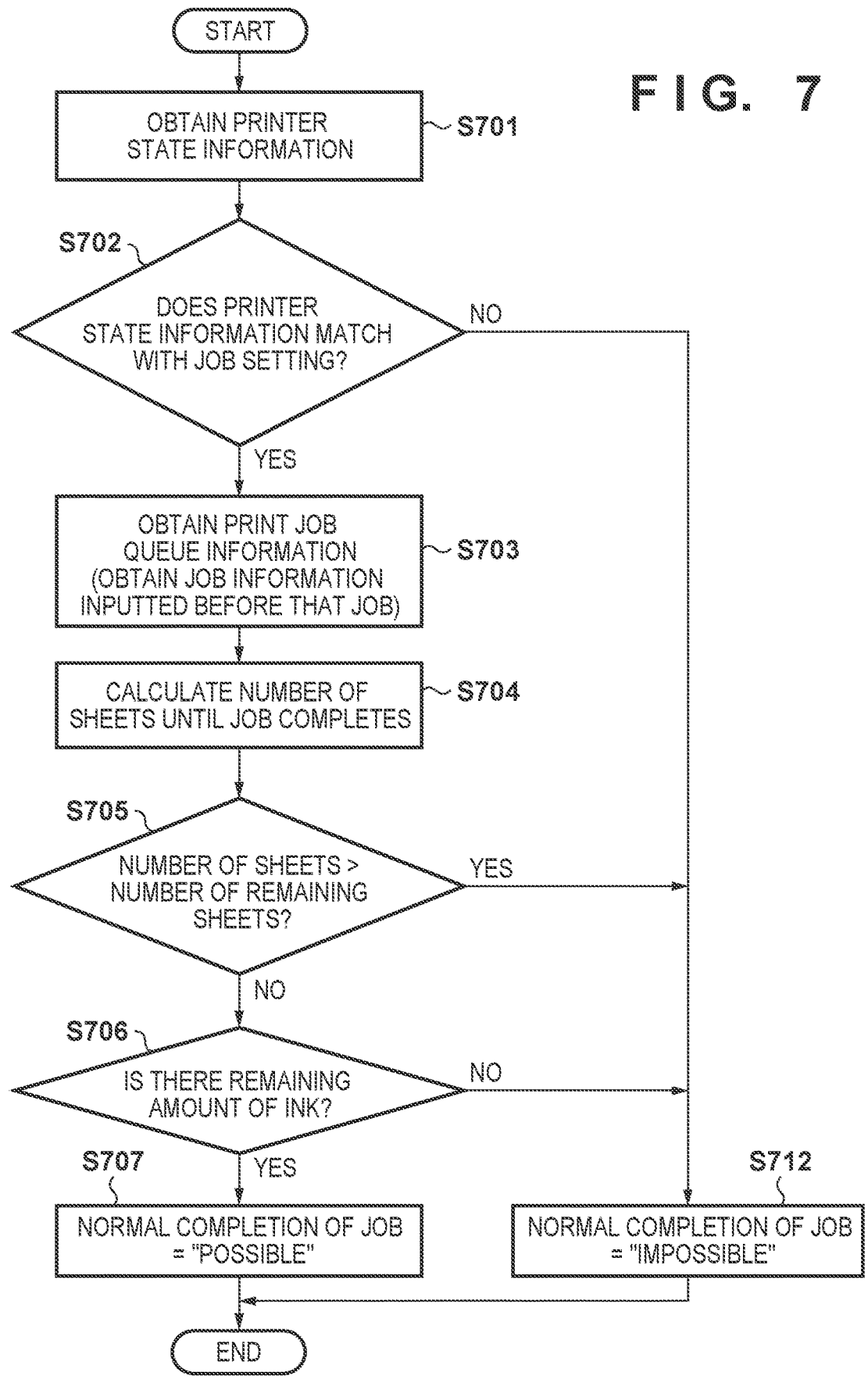
FIG. 7 is a flowchart illustrating processing in step S602.

FIG. 7 is a flowchart illustrating the processing in step S602. In step S701, the CPU 300 obtains printer state information. The printer state information includes setting state information such as the type and size of a sheet fed to the printer 106, and consumables state information such as the number of remaining sheets and the remaining amount of ink. In step S702, the CPU 300 compares the printer state information obtained in step S701 with the setting information of the monitoring-target print job. If it is determined that the comparison result indicates that they do not match, in step S712, the CPU 300 determines that "the job cannot be completed normally". In step S712, the CPU 300 stores, for example, flag information such as "normal completion of job="impossible"" in the storage area. On the other hand, if it is determined that the comparison result indicates that they match, in step S703, the CPU 300 obtains print job queue information stored in the printer 106 to obtain job information of a print job other than the monitoring-target print job.

In step S704, the CPU 300 extracts, from the print job queue information obtained in step S703, the print job which has been input into the print job queue before the monitoring-target print job and whose printing is performed before the monitoring-target print job. Then, the CPU 300 adds up the job sizes respectively included in the extracted pieces of print job information, and calculates the (estimated) number of sheets expected to be consumed by the time the monitoring-target print job is executed and printing is completed.

In step S705, the CPU 300 determines whether the number of sheets expected to be consumed, which is calculated in step S704, is larger than the number of remaining sheets serving as the consumables state information obtained in step S701. If it is determined that the number of sheets is larger than the number of remaining sheets, the monitoring-target print job is unlikely to be completed normally due to the insufficient number of remaining sheets, so that the processing advances to step S712, and the CPU 300 determines that "the job cannot be completed normally". On the other hand, if it is determined that the number of sheets is not larger than the number of remaining sheets, the processing advances to step S706.

In step S706, the CPU 300 determines whether the remaining amount of ink serving as the consumables state information obtained in step S701 is equal to or larger than a threshold value. If it is determined that the remaining amount of ink is not equal to or larger than the threshold value, the monitoring-target print job is unlikely to be completed normally due to the insufficient remaining amount of ink, so that the processing advances to step S712, and the CPU 300 determines that "the job cannot be completed normally". On the other hand, if it is determined that the remining amount of ink is equal to or larger than the threshold value, in step S707, the CPU 300 determines that "the job can be completed normally". In step S707, the CPU 300 stores, for example, flag information such as "normal completion of job="possible"" in the storage area. After step S707, the processing of FIG. 7 is terminated.

Figure 8:
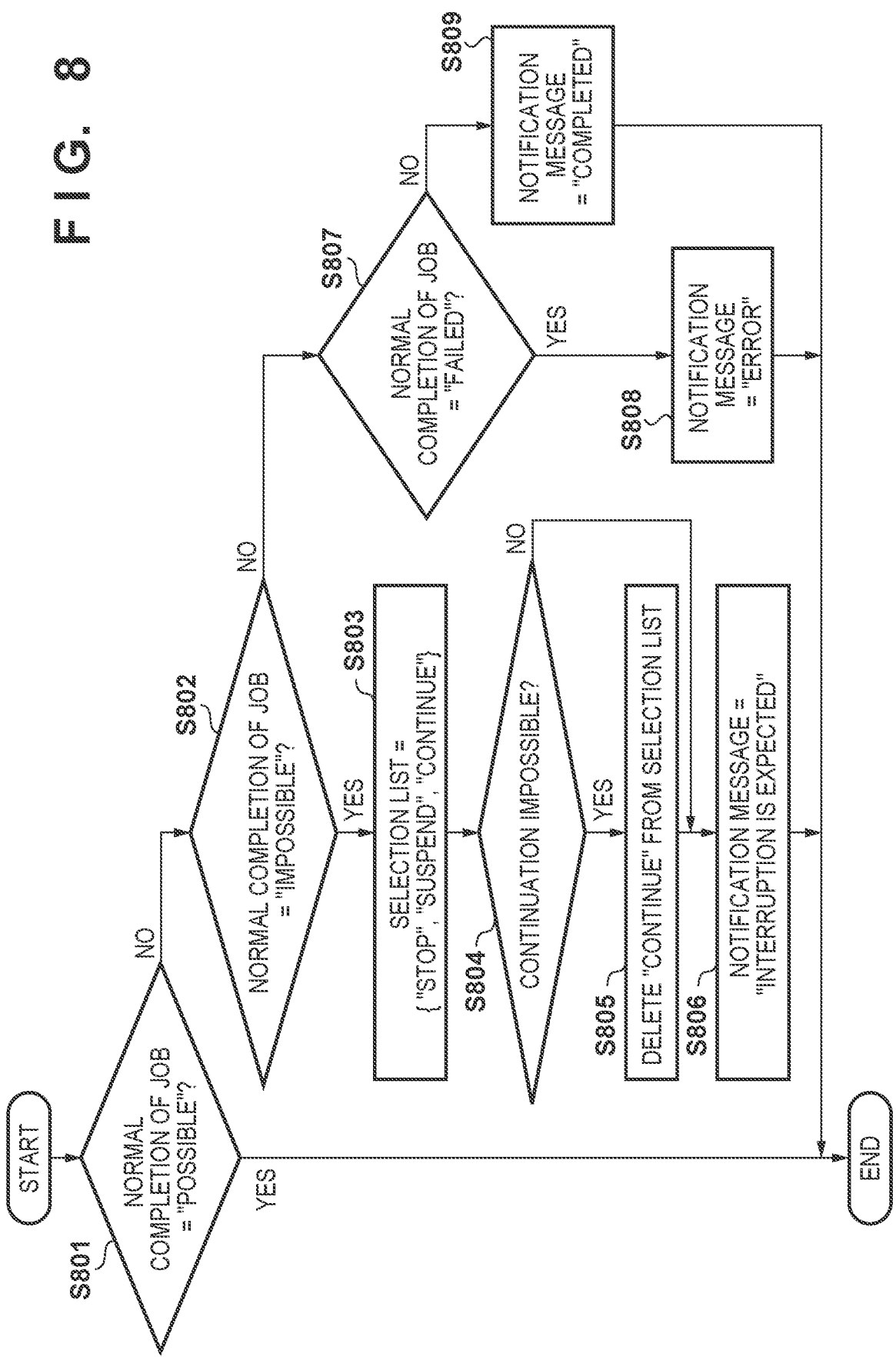
FIG. 8 is a flowchart illustrating processing in step S502.

FIG. 8 is a flowchart illustrating the notification information generation processing in step S502. The CPU 300 generates notification information corresponding to the determination result in the processing of determining the possibility/impossibility of normal completion of the job in step S602. In step S801, the CPU 300 determines whether the determination result indicates that "the job can be completed normally". For example, the CPU 300 determines whether the flag information stored in the storage area is "normal completion of job="possible". If the determination result indicates that "the job can be completed normally", the monitoring-target print job is likely to be completed normally and there is no information to be particularly informed to the user, so no notification information is generated, and the processing of FIG. 8 is terminated. On the other hand, if the determination result does not indicate that "the job can be completed normally", in step S802, the CPU 300 determines whether the determination result indicates that "the job cannot be completed normally". For example, the CPU 300 determines whether the flag information stored in the storage area is "normal completion of job="impossible"". If the determination result indicates that "the job cannot be completed normally", the processing advances to step S803.

In step S803, since the monitoring-target print job may not be completed normally, the CPU 300 generates a selection list which allows the user to select a plurality of job control methods. Values to be set as selection items in the selection list are, for example, "stop execution of printing (selection list="stop")", "temporarily set the job in a suspended state and temporarily remove the job from the print job queue (selection list="suspend"), and "forcedly execute printing (selection list="continue").

In step S804, the CPU 300 determines whether the printer 106 is in a state in which printing cannot be continued. The state in which printing cannot be continued is, for example, a case in which it has been determined that the number of sheets expected to be consumed by the time of completion of execution of the monitoring-target print job is larger than the number of remaining sheets. In this case, it is physically impossible to complete the execution of the print job due to the insufficient number of remaining sheets, so that it is determined that the printer 106 is in the state in which the printing cannot be continued. In step S804, the processing from step S703 to step S705 may be performed. If the processing from step S703 to S705 has been already performed in step S602, the result obtained therein may be used. If it is determined in step S804 that the printer 106 is in the state in which the printing cannot be continued, the CPU 300 deletes (excludes) the value "continue" from the selection list in step S805. As a result, the user can be prevented from selecting continuation of the printing as the job control method. In step S806, the CPU 300 generates notification information in which, together with the job identification information and the selection list, "interruption is expected" is set as a notification message to be notified on the mobile terminal apparatus 104. Then, the processing of FIG. 8 is terminated. In this manner, in this embodiment, it is possible not only to simply inform the state of the print job but also to include, in the notification information, the job control instruction in accordance with the state.

If it is determined in step S802 that the determination result does not indicate that "the job cannot be completed normally", the CPU 300 determines in step S807 whether the determination result indicates that "the print job is completed normally". For example, the CPU 300 determines whether the flag information stored in the storage area is "normal completion of job="successful"" or "normal completion of job="failed"". If it is determined in step S807 that the determination result does not indicate that "the print job is completed normally", in step S808, the CPU 300 generates notification information in which, together with the job identification information, "error" is set as a notification message to be notified on the mobile terminal apparatus 104. Then, the processing of FIG. 8 is terminated. On the other hand, if it is determined that the determination result indicates that "the print job is completed normally", in step S809, the CPU 300 generates notification information in which, together with the job identification information, "completed" is set as a notification message to be notified on the mobile terminal apparatus 104. Then, the processing of FIG. 8 is terminated.

Note that in this embodiment, "interruption is expected", "error", and "completed" are exemplified as notification messages, but the present disclosure is not limited thereto. For example, if "interruption is expected" or "error" is to be set as the notification message, detailed information based on the printer state information and the setting information of the monitoring-target print job may be included. For example, if the sheet information included in the setting information of the monitoring-target print job does not match the sheet information included in the printer state information, the information of the sheet currently placed in the printer 106 may be included as the printer state information.

After the processing of FIG. 8 is terminated, as described with reference to FIG. 5, the CPU 300 transmits the notification information generated in step S502 to the push notification server 102 in step S503.

As has been described above, in this embodiment, the information processing apparatus 100 obtains the printer state information and the print job queue information from the printer 106, and determines the state of the print job accumulated in the print job queue as the execution standby state. The information processing apparatus 100 determines, as the state of the print job, for example, the execution result (successful/failed) of the print job or the impossibility of normal completion of the print job, and transmits the determination result to the push notification server 102 as notification information. Particularly, if it is determined that the print job cannot be completed normally, the information processing apparatus 100 specifies the job control method which the user can perform, and transmits the notification information including information of the specified job control method to the push notification server 102.

[Operation of Terminal-Side Application]

Figure 9:
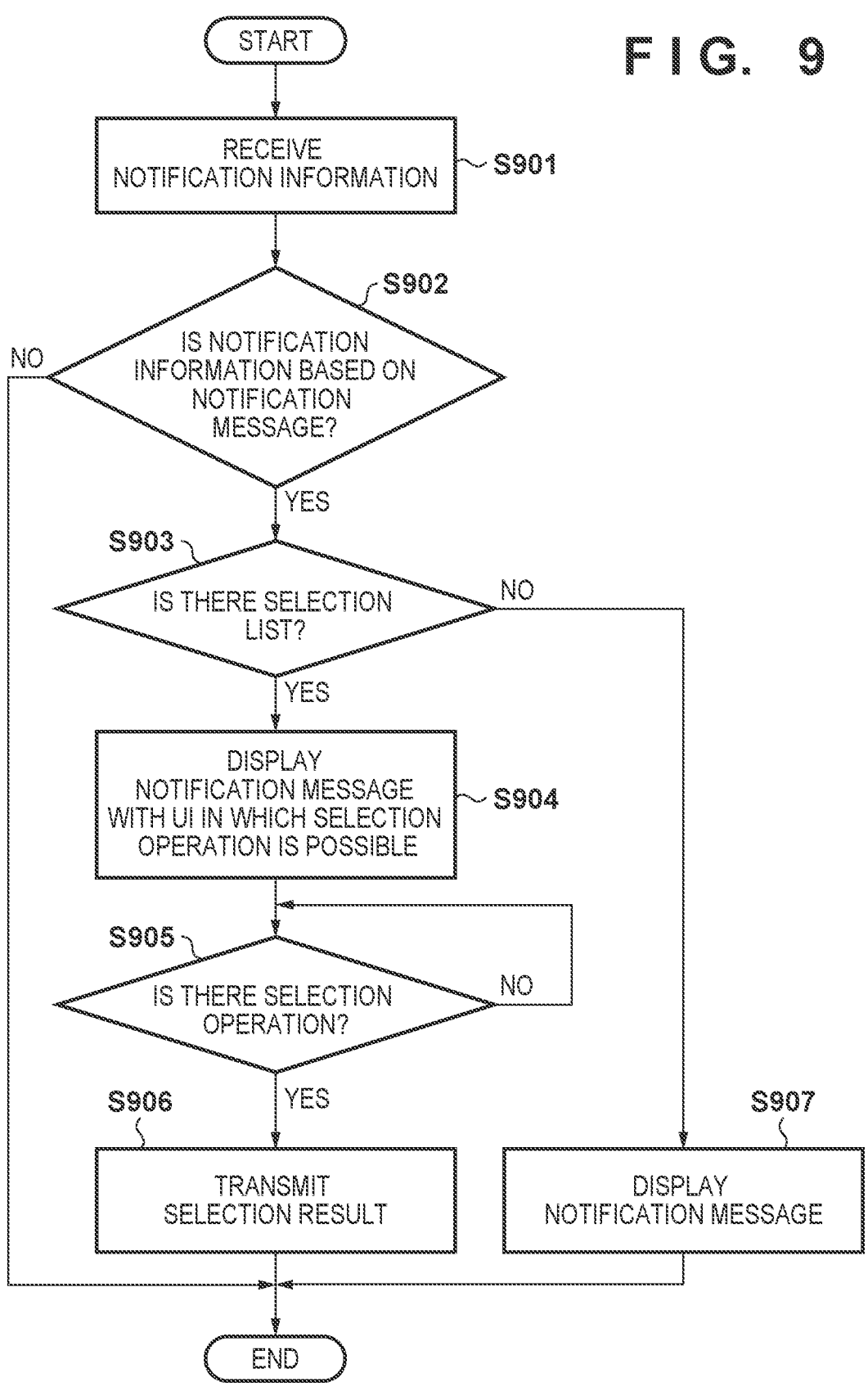
FIG. 9 is a flowchart illustrating processing performed by the mobile terminal apparatus.

FIG. 9 is a flowchart illustrating processing performed by the mobile terminal apparatus 104 in this embodiment. Each processing of the flowchart shown in FIG. 9 is implemented by, for example, the CPU 413 reading out the terminal-side application stored in the ROM 411 into the RAM 412 and executing it.

When the notification information is received by the mobile terminal apparatus 104 via the service providing server 103, the CPU 413 first analyzes the notification information using the OS of the mobile terminal apparatus 104. Since the notification information includes information of the application corresponding to the notification information, the CPU 413 specifies the application corresponding to the received notification information. In this embodiment, since the notification information corresponds to the terminal-side application, the CPU 413 sends the notification information to the terminal-side application. Note that the following processing to be performed by the terminal-side application upon receiving the notification information may be performed in a state in which the terminal-side application is not operating in foreground.

In step S901, the CPU 413 receives the notification information by the terminal-side application, and starts to analyze the notification information. Then, in step S902, the CPU 413 determines whether the notification information is notification information transmitted from the PC-side application of the information processing apparatus 100. The determination in step S902 is performed based on, for example, whether the notification information includes information in the key/value format, a specific character string, or information corresponding to the message. Note that the notification information transmitted from the PC-side application refers to the notification information based on the notification message in this embodiment. If it is determined that the notification information is the notification information transmitted from the PC-side application, the processing advances to step S903. On the other hand, if it is determined that the notification information is not the notification information transmitted from the PC-side application, the processing of FIG. 9 is terminated without displaying the notification message in this embodiment.

In step S903, the CPU 413 determines whether the selection list is included in the notification information generated in step S502. If it is determined that no selection list is included in the notification information, the processing advances to step S907, and the CPU 413 displays the notification message on the display unit 408. In this case, as the notification message to be displayed, for example, "printing has resulted in an error" corresponding to "error" set in step S808 of FIG. 8 is displayed. Alternatively, for example, "printing has been completed normally" corresponding to "completed" set in step S809 is displayed. The message contents to be displayed may be set in advance so as to correspond to the value set in the notification information.

On the other hand, if it is determined that the selection list is included in the notification information, in step S904, the CPU 413 displays, on the display unit 408, buttons associated with the selection list included in the notification message, that is, an operation unit capable of accepting a selection operation of the user. Then, in step S905, the CPU 413 displays the notification message and the operation unit until an operation is accepted from the user. If a selection operation is accepted from the user via the operation unit, in step S906, the CPU 413 transmits information of the accepted selection result to the push notification server 102, and then terminates the processing of the FIG. 9.

Figure 11:
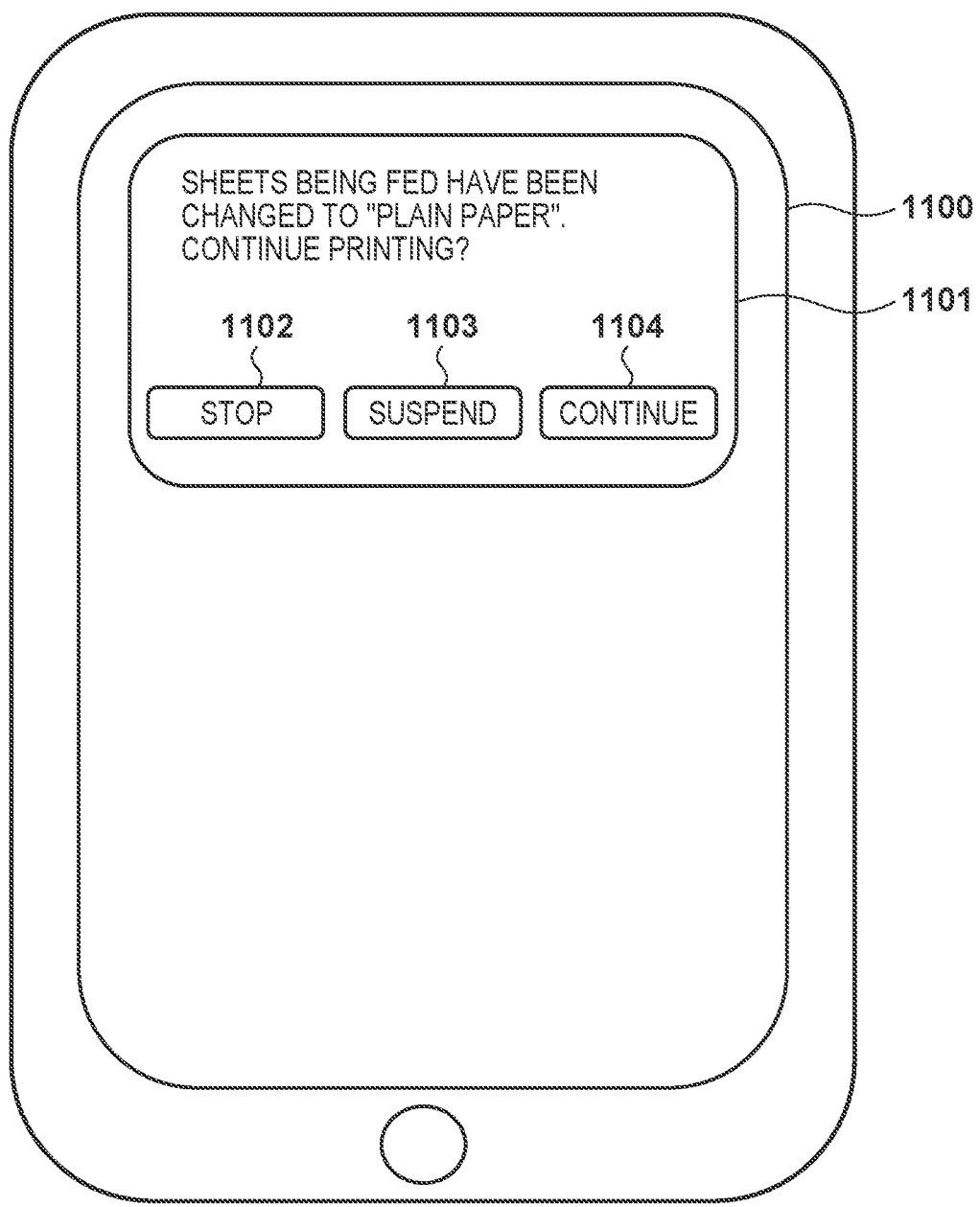
FIG. 11 is a view showing a screen displayed on the mobile terminal apparatus.

FIG. 11 is a view showing an example of a screen in which the notification message is displayed on the mobile terminal apparatus 104 by the push notification function. A display region 1100 indicates the maximum displayable region of the display unit 408, and a notification region 1101 indicates a region for displaying the notification message included in the notification information and the operation unit which enables user selection. As the operation unit, a stop button 1102, a suspend button 1103, and a continue button 1104 are displayed. The operation unit is displayed if it is determined in step S903 that the selection list is included in the notification information, and displayed in association with the values of the selection list set in the processing from step S803 to step S805. That is, if the value "continue" has been deleted from the selection list in step S805, the continue button 1104 is not displayed. With such the configuration, when the print job set in the execution standby state cannot be completed normally (for example, the number of remaining sheets in the printer 106 is insufficient), the user can be prevented from instructing continuation of the printing.

[Operation of Push Notification Server]

Figure 10:
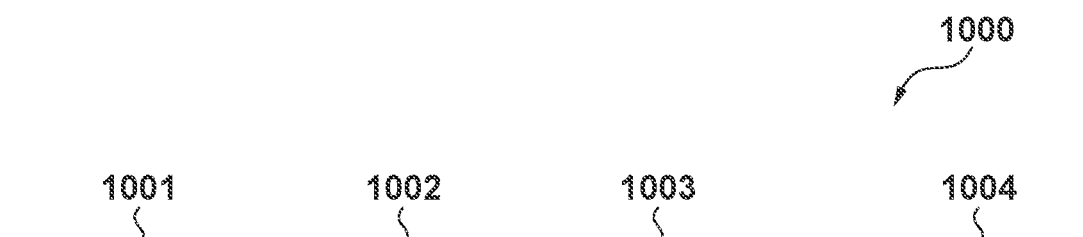
FIG. 10 is a view showing a notification information management table.

FIG. 10 is a view showing an example of a notification information management table 1000. The notification information management table 1000 is managed in the storage area such as the ROM 402 of the push notification server 102, and accessible from both the information processing apparatus 100 and the mobile terminal apparatus 104. Each row of the notification information management table 1000 is registered when the registration processing for push notification is performed in advance by the above-described information transmission step. When the registration processing by the information transmission step is performed, identification information 1001 of the PC-side application used to specify the transmission source of the notification information and terminal identification information 1002 used to specify the transmission destination of the notification information are set. Then, job identification information 1003 is set, which is used to specify the job corresponding to the notification information transmitted from the PC-side application in the notification information transmission processing in step S503. At the time when the push notification server 102 receives the notification information from the PC-side application, for example, "waiting for reception" is set as an initial value in the value of job control information 1004, and this is updated by the processing of the terminal-side application illustrated in FIG. 9. For example, when the information of the selection result transmitted from the mobile terminal apparatus 104 in step S906 is received, the information of the selection result is set as the job control information 1004.

When the job control information 1004 of the notification information management table 1000 is updated, the CPU 401 of the push notification server 102 transmits the updated value to the PC-side application of the information processing apparatus 100 as the information of the job control method. Then, in step S504 of FIG. 5, the CPU 300 of the information processing apparatus 100 performs the job control processing on the printer 106 based on the received information of the job control method. For example, if the stop button 1102 is selected on the mobile terminal apparatus 104, the CPU 300 of the information processing apparatus 100 stops execution of the printing in the printer 106. Note that the CPU 300 of the information processing apparatus 100 may obtain the information of the job control method with respect to the transmitted notification information by polling the push notification server 102.

As has been described above, according to this embodiment, the mobile terminal apparatus 104, which is not connected to the same network as the information processing apparatuses 100 and 101 and the printer 106, can control a print job. As a result, for example, even if the user is located away from the printer 106 and the information processing apparatuses 100 and 101, the user can instruct control of the print processing based on the state of the printer 106. Further, in this embodiment, the operation which the mobile terminal apparatus 104 can control is specified in accordance with the state of the printer 106. For example, in a case in which the user tries to continue printing even though the sheet setting of the job is different from the sheet set in the printer 106, if the number of remaining sheets is insufficient in the printer 106, the printing is likely to be failed even if the printing is continued. In this embodiment, in such a case, the selection item "continue" is not displayed on the mobile terminal apparatus 104 as a result of the processing in step S805. Accordingly, the user can be prevented from instructing control of the print processing which is likely to be failed.

Second Embodiment

A difference of the second embodiment from the first embodiment will be described below. In this embodiment, notification information generation processing is performed based on the location information of a printer 106 and the location information of a mobile terminal apparatus 104.

FIG. 12 is a view showing an example of a notification information management table 1200 managed by a push notification server 102 in this embodiment. The notification information management table 1200 is different from the notification information management table 1000 shown in FIG. 10 in that location information 1201 is included. The location information 1201 is information such as GPS information used to specify the location of the mobile terminal apparatus 104. The location information 1201 is, for example, transmitted from the mobile terminal apparatus 104 in the information transmission step described above. Alternatively, the location information 1201 may be transmitted asynchronously with the communication related to the notification information between the terminal-side application and the push notification server 102 as described above. For example, the location information 1201 may be periodically transmitted and updated at arbitrary predetermined time intervals.

Figure 13:
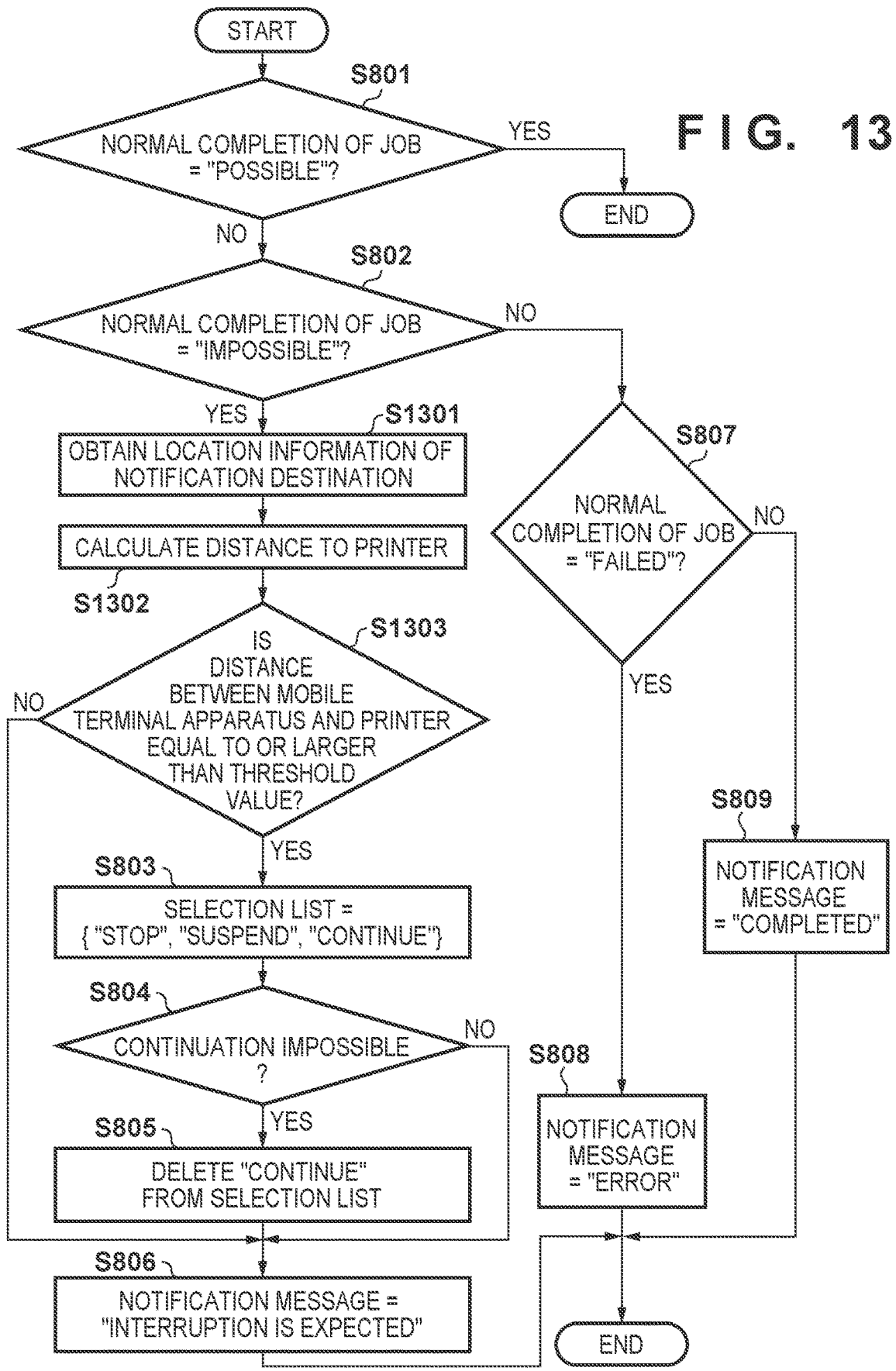
FIG. 13 is a flowchart illustrating another process in step S502.

FIG. 13 is a flowchart illustrating notification information generation processing performed in step S502 in this embodiment. This is different from the processing of FIG. 8 in that notification information is generated based on the location information of the mobile terminal apparatus 104 and the location information of the printer 106. If it is determined in step S802 of FIG. 13 that the determination result indicates that "the job cannot be completed normally", in step S1301, a CPU 300 obtains, from the push notification server 102, the location information 1201 of the mobile terminal apparatus 104 which is the transmission destination of the notification information. In step S1302, the CPU 300 calculates the distance between the mobile terminal apparatus 104 and the printer 106 based on the location information 1201 obtained in step S1301. Here, the location information of the printer 106 may be obtained in advance from the printer 106 by the PC-side application and stored. Alternatively, for example, the location information of the printer 106 may be obtained from the printer state information when the printer state information is obtained in step S701.

In step S1303, the CPU 300 determines whether the calculation result in step S1302 is equal to or larger than a threshold value. If it is determined that the calculation result is equal to or larger than the threshold value, since the monitoring-target print job may not be completed normally, the processing in step S803 is performed as in the first embodiment. The processing from step S803 is similar to that in the first embodiment. On the other hand, if it is determined that the calculated result is not equal to or larger than the threshold value (smaller than the threshold value), that is, if it is determined that the mobile terminal apparatus 104 and the printer 106 are located at a short distance from each other, the user of the mobile terminal apparatus 104 returns to the location where the printer 106 is installed. Then, the user is assumed to be capable of performing job control. Therefore, it is determined that it is unnecessary to generate a selection list that enables remote job control of the printer 106, and the processing advances from S1303 to step S806 without generating the selection list.

Figure 14:
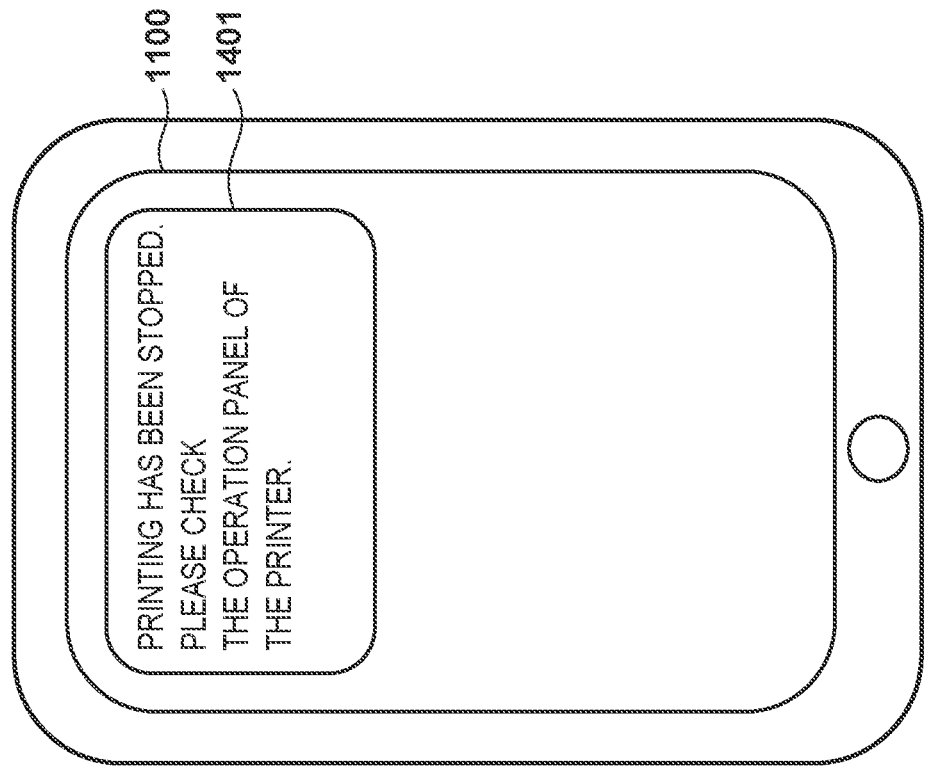
FIG. 14 is a view showing a screen displayed on another mobile terminal apparatus.

FIG. 14 is a view showing an example of a screen in which the notification information is displayed on the mobile terminal apparatus 104 by the push notification function in this embodiment. If it is determined in step S1303 that the calculation result is not equal to or larger than the threshold value, that is, if it is determined that the mobile terminal apparatus 104 and the printer 106 are located at a short distance from each other, an operation unit which enables user selection is not displayed as in a notification region 1401. Instead, a message prompting the user to return to the location where the printer 106 is installed is displayed on a display unit 408.

As has been described above, according to this embodiment, the notification information is generated in accordance with the distance between the mobile terminal apparatus 104 and the printer 106 with reference to the location information of the mobile terminal apparatus 104. For example, if the user carrying the mobile terminal apparatus 104 is in a distance where the user can immediately return to the printer 106, a message prompting the user to return to the location where the printer 106 is installed is displayed. As a result, instead of the remote operation, the user can perform desired job control directly on the printer 106. Further, even if the job state, in which the user cannot continue remote control, is received as the notification information, for example, even if the printer 106 needs sheet replenishment, the user can immediately return to the location where the printer is installed and directly handle it.

Third Embodiment

A difference of the third embodiment from the first and second embodiments will be described below. In each of the above-described embodiments, it has been described that, in step S504, the information processing apparatus 100 performs the job control processing on the printer 106 based on the information of the selection result of the job control method transmitted from the mobile terminal apparatus 104 via the push notification server 102, thereby terminating the processing. In the third embodiment, as to a print job for which "suspend" is performed as the job control processing, an information processing apparatus 100 further performs monitoring processing of the print job based on the location information of a printer 106 and the location information of a mobile terminal apparatus 104.

Figure 15:
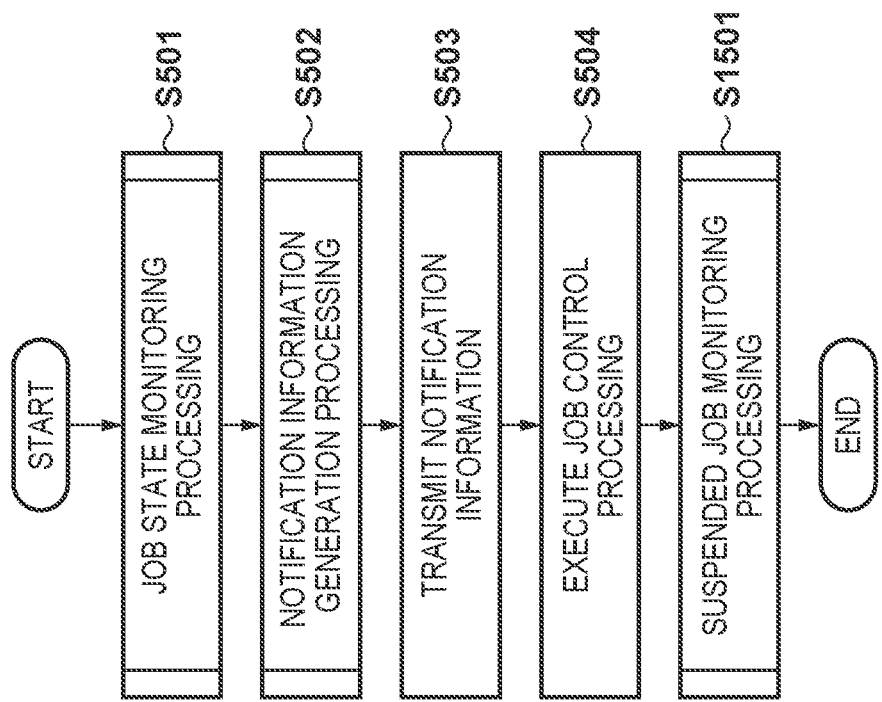
FIG. 15 is a flowchart illustrating processing performed by another information processing apparatus.

FIG. 15 is a flowchart illustrating the processing performed by the information processing apparatus 100 in this embodiment. After step S504 of FIG. 15, a CPU 300 performs suspended job monitoring processing in step S1501.

Figure 16:
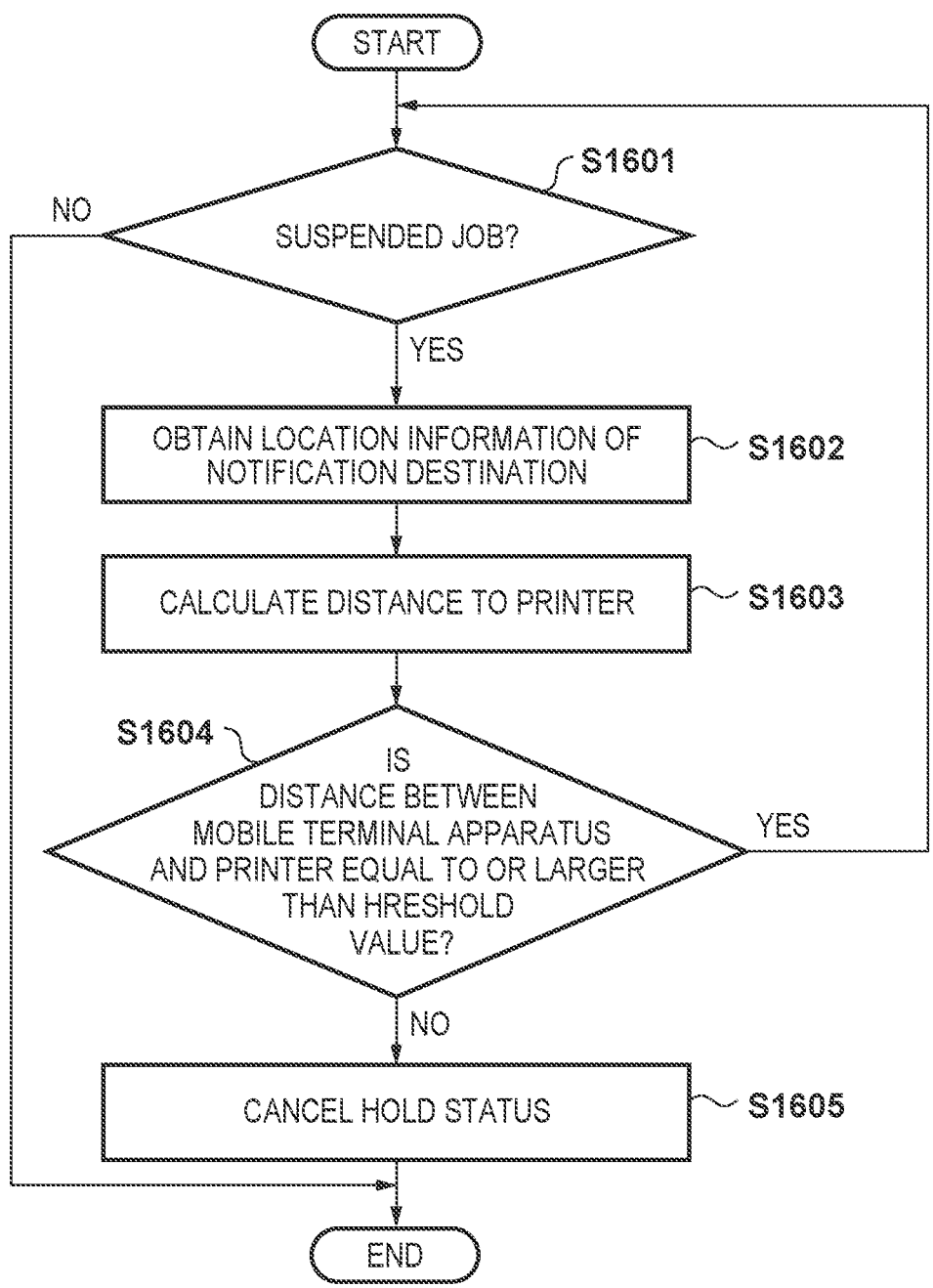
FIG. 16 is a flowchart illustrating processing in step S1501.

FIG. 16 is a flowchart illustrating the suspended job monitoring processing in step S1501. In step S1601, the CPU 300 determines whether there is a suspended job as a result of performing job control processing in step S504. If it is determined that there is no suspended job, the processing of FIG. 16 is terminated. On the other hand, if it is determined that there is a suspended job, in step S1602, the CPU 300 obtains location information 1201 of the mobile terminal apparatus 104, which is the transmission destination of the notification information, from a push notification server 102. In step S1603, the CPU 300 calculates the distance between the mobile terminal apparatus 104 and the printer 106 based on the location information 1201 obtained in step S1602. Obtainment of the location information of the printer 106 and the location information of the mobile terminal apparatus 104 and calculation of the distance between them are similar to those described in the second embodiment.

In step S1604, the CPU 300 determines whether the distance calculated in step S1603 is equal to or larger than a threshold value. If it is determined that the calculated distance is equal to or larger than the threshold value, that is, if it is determined that the mobile terminal apparatus 104 and the printer 106 are located at a long distance from each other, the CPU 300 returns to step S1601, and repeats the processing of determining whether there is a suspended job. On the other hand, if it is determined that the distance between the mobile terminal apparatus 104 and the printer 106 is smaller than the threshold value, that is, the mobile terminal apparatus 104 and the printer 106 are located at a short distance from each other, in step S1605, the CPU 300 performs, on the printer 106, processing of canceling the suspended state of the job. For example, the information processing apparatus 100 inputs the print job into the print job queue of the printer 106 again. In this case, job state monitoring processing in step S501 of FIG. 15 is performed.

As has been described above, according to this embodiment, in accordance with the distance between the mobile terminal apparatus 104 and the printer 106 with reference to the location information of the mobile terminal apparatus 104, the suspension of the job is continued or the suspension is canceled to perform printing again. As a result, the print processing can be completed at a more appropriate timing for the user. For example, if a distance in which the user carrying the mobile terminal apparatus 104 can immediately return to the printer 106 is set as the threshold value in step S1604, printing can be performed again at a timing when the user is located at the set distance. As a result, it is possible to prevent an excessively long interruption of the print processing in the printer 106.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While various embodiments of the present disclosure have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-93672, filed May 28, 2020, which is hereby incorporated by reference herein in its entirety.

What is claimed is:

1. An information processing system including an information processing apparatus capable of communicating with a printing apparatus, and a mobile terminal apparatus,
the information processing apparatus comprising:
a first memory containing instructions; and
a first processor for executing the instructions to:
obtain a state of a job input to the printing apparatus;
generate, based on the state of the obtained job, notification information including instruction information used to control the job; and
transmit the generated notification information to a network, and
the mobile terminal apparatus comprising:
a second memory containing instructions; and
a second processor for executing the instructions to:
receive the notification information from the network; and
notify, based on the received notification information, the instruction information used to control the job;
wherein the first processor of the information processing apparatus further executes instructions to estimate an execution result of a job which has been input to the printing apparatus but is in an execution standby state,
obtain, as a state of the job, the estimated execution result, and
in a case in which the estimated execution result indicates abnormal completion, generate the notification information including the instruction information used to control the job.

2. The system according to claim 1, wherein
the case in which the estimated execution result indicates abnormal completion includes a case in which setting of the job input to the printing apparatus is different from setting of the printing apparatus.

3. The system according to claim 1, wherein
the case in which the estimated execution result indicates abnormal completion includes a case in which a remaining amount of consumables is insufficient in the printing apparatus.

4. The system according to claim 3, wherein
the consumables include at least one of a sheet and ink.

5. The system according to claim 1, wherein
in the case in which the estimated execution result indicates normal completion, the notification information is not generated.

6. The system according to claim 1, wherein
in a case in which a distance between the printing apparatus and the mobile terminal apparatus is smaller than a threshold value and the estimated execution result indicates abnormal completion, notification information is generated which includes no instruction information used to control the job and indicates the abnormal completion.

7. The system according to claim 1, wherein
in a case in which the state of the job indicates a result obtained by executing the job in the printing apparatus, notification information is generated which includes no instruction information used to control the job and indicates the result.

8. The system according to claim 1, wherein
the instruction information used to control the job includes a plurality of selection items, and
the plurality of selection items include at least one of a stop of the job, suspension of the job, and forced execution of the job.

9. The system according to claim 8, wherein
in a case in which a remaining amount of consumables is insufficient in the printing apparatus, the forced execution of the job is excluded from the plurality of selection items.

10. The system according to claim 8, wherein
the second processor in the mobile terminal apparatus further executes the instructions to:
transmit information selected from the plurality of selection items to the network, and
the first processor in the information processing apparatus further executes instructions to:
receive the selected information from the network, and
control the printing apparatus based on the selected information.

11. The system according to claim 10, wherein
in a case in which the selected information indicates the suspension of the job, the job input to the printing apparatus is suspended, and the suspended job is monitored based on a distance between the printing apparatus and the mobile terminal apparatus.

12. The system according to claim 11, wherein
in a case in which the distance between the printing apparatus and the mobile terminal apparatus is smaller than a threshold, a suspended state of the suspended job is cancelled.

13. The system according to claim 1, wherein
the network includes a server, and
the server is configured to receive the transmitted notification information and the notification information is transmitted to the mobile terminal apparatus as a transmission destination.

14. An information processing apparatus capable of communicating with a printing apparatus, comprising:
a memory containing instructions; and
a processor for executing the instructions to:
obtain a state of a job input to the printing apparatus;
generate, based on the obtained state of the job, notification information including instruction information used to control the job;
transmit the generated notification information to a network;
estimate an execution result of a job which has been input to the printing apparatus but is in an execution standby state; and
obtain, as a state of the job, the estimated execution result, wherein
in a case in which the estimated execution result indicates abnormal completion, the notification information including the instruction information used to control the job is generated.

15. The apparatus according to claim 14, wherein
the case in which the estimated execution result indicates abnormal completion includes a case in which setting of the job input to the printing apparatus is different from setting of the printing apparatus.

16. The apparatus according to claim 14, wherein
the case in which the estimated execution result indicates abnormal completion includes a case in which a remaining amount of consumables is insufficient in the printing apparatus.

17. The apparatus according to claim 16, wherein
the consumables include at least one of a sheet and ink.

18. The apparatus according to claim 14, wherein
in a case in which a distance between the printing apparatus and a mobile terminal apparatus is smaller than a threshold value and the estimated execution result indicates abnormal completion, notification information is generated which includes no instruction information used to control the job and indicates the abnormal completion.

19. The apparatus according to claim 14, wherein
the instruction information used to control the job includes a plurality of selection items, and
the plurality of selection items include at least one of a stop of the job, suspension of the job, and forced execution of the job.

20. The apparatus according to claim 19, wherein
in a case in which a remaining amount of consumables is insufficient in the printing apparatus, the forced execution of the job is excluded from the plurality of selection items.

21. A non-transitory computer-readable storage medium storing a program for causing a computer to:
obtain a state of a job input to a printing apparatus;
generate, based on the obtained state of the job, notification information including instruction information used to control the job;
transmit the generated notification information to a network including a mobile terminal apparatus on which notification based on the notification information is performed
estimate an execution result of a job which has been input to the printing apparatus but is in an execution standby state;
obtain, as a state of the job, the estimated execution result, and
in a case in which the estimated execution result indicates abnormal completion, generate the notification information including the instruction information used to control the job.

* * * * *